US010457240B2

United States Patent
Greer, Jr. et al.

(10) Patent No.: US 10,457,240 B2
(45) Date of Patent: Oct. 29, 2019

(54) GLOVE BOX RAIL WITH INTEGRATED AIRBAG SUPPORT

(71) Applicant: Magnesium Products of America Inc., Eaton Rapids, MI (US)

(72) Inventors: David Richard Greer, Jr., Northville, MI (US); Joshua Lee McConnell, Marysville, OH (US)

(73) Assignee: MAGNESIUM PRODUCTS OF AMERICA, Eaton Rapids, MI (US)

( * ) Notice: Subject to any disclaimer, the term of this patent is extended or adjusted under 35 U.S.C. 154(b) by 0 days.

(21) Appl. No.: 15/343,479

(22) Filed: Nov. 4, 2016

(65) Prior Publication Data

US 2018/0126940 A1 May 10, 2018

(51) Int. Cl.
*B60R 21/206* (2011.01)
*B62D 25/14* (2006.01)
*B60R 21/205* (2011.01)

(52) U.S. Cl.
CPC .......... *B60R 21/206* (2013.01); *B62D 25/145* (2013.01); *B60R 21/205* (2013.01)

(58) Field of Classification Search
CPC ........ B60R 21/206; B60R 2021/23169; B60R 2021/0051; B60R 2011/0005; B60R 21/2338; B60R 21/231; B60R 21/215; B60R 21/205; B60R 7/06; B62D 25/145; B62D 25/08; B60K 2350/40; B60K 2350/943

See application file for complete search history.

(56) References Cited

U.S. PATENT DOCUMENTS

| 4,978,136 A * | 12/1990 | Tomita | B60R 21/045 280/751 |
| 5,275,456 A * | 1/1994 | Ishii | B60R 7/06 16/85 |
| 5,387,023 A * | 2/1995 | Deneau | B62D 25/147 296/187.12 |
| 5,413,379 A * | 5/1995 | Koma | B60R 7/06 280/751 |
| 5,456,494 A * | 10/1995 | Witkovsky | B60R 21/045 188/377 |

(Continued)

FOREIGN PATENT DOCUMENTS

| DE | 19842672 | 3/2000 |
| DE | 102005033764 | 1/2007 |

*Primary Examiner* — Paul N Dickson
*Assistant Examiner* — Timothy Wilhelm
(74) *Attorney, Agent, or Firm* — Foley & Lardner LLP

(57) ABSTRACT

A rail for supporting a glove box assembly and airbag canister includes a substantially planar body having an upper and lower surface, the upper surface defining a plurality of ribs. The rail further includes a wall projecting from at least a portion of an outer periphery of the lower surface, a first plurality of connection points configured to couple an airbag canister to the rail, and a second plurality of connection points configured to couple a glove box assembly to the rail. The rail further includes a first appendage extending from a first end of the body and a second appendage extending from a second end of the body, the first and second appendages configured to couple the rail to a dashboard assembly. The rail is integrally formed as a single component.

17 Claims, 7 Drawing Sheets

(56) References Cited

U.S. PATENT DOCUMENTS

| | | | | |
|---|---|---|---|---|
| 5,676,216 A * | 10/1997 | Palma | B60H 1/00028 | 180/90 |
| 6,152,512 A * | 11/2000 | Brown | E05B 83/30 | 296/37.12 |
| 6,213,504 B1 * | 4/2001 | Isano | B60R 21/045 | 280/748 |
| 6,276,740 B1 * | 8/2001 | Mellor | B21D 39/04 | 280/90 |
| 6,296,277 B1 * | 10/2001 | Bittinger | B60R 21/045 | 280/728.2 |
| 6,394,527 B2 * | 5/2002 | Ohno | B62D 25/08 | 296/193.02 |
| 6,536,802 B1 * | 3/2003 | Sutherland | B60R 21/045 | 180/90 |
| 6,676,202 B2 * | 1/2004 | Brancheriau | B62D 25/142 | 296/208 |
| 6,799,785 B1 * | 10/2004 | Davis, Jr. | B60R 7/06 | 16/303 |
| 6,851,742 B1 * | 2/2005 | Kubiak | B62D 25/145 | 296/193.02 |
| 6,929,295 B2 * | 8/2005 | Nurenberg | E05C 1/10 | 292/102 |
| 6,971,667 B2 | 12/2005 | Enders et al. | | |
| 6,988,764 B2 * | 1/2006 | Matsutani | B62D 25/145 | 180/90 |
| 7,048,311 B2 * | 5/2006 | Sawatani | B60R 7/06 | 292/32 |
| 7,261,318 B2 * | 8/2007 | Enders | B60R 21/206 | 280/732 |
| 7,284,789 B2 * | 10/2007 | Wolf | B62D 25/145 | 180/90 |
| 7,290,787 B2 * | 11/2007 | Hayakawa | B60R 21/231 | 280/728.2 |
| 7,367,613 B2 * | 5/2008 | Ellison | B62D 25/145 | 296/193.02 |
| 7,377,539 B2 * | 5/2008 | Tsujimoto | B60R 21/205 | 280/728.2 |
| 7,407,221 B2 * | 8/2008 | Kring | B62D 25/145 | 296/193.02 |
| 7,455,315 B2 * | 11/2008 | Yokoyama | B60R 21/231 | 280/730.1 |
| 7,568,756 B2 * | 8/2009 | Meier | B62D 25/145 | 296/193.02 |
| 7,695,044 B2 * | 4/2010 | Takeda | B62D 25/142 | 296/70 |
| 7,731,261 B2 * | 6/2010 | Wenzel | B29C 45/006 | 180/90 |
| 7,891,707 B2 * | 2/2011 | Kuwano | B62D 25/145 | 280/779 |
| 7,891,726 B2 * | 2/2011 | Gavrilov | B62D 21/15 | 188/377 |
| 8,136,832 B2 | 3/2012 | Rick et al. | | |
| 8,146,942 B2 * | 4/2012 | Bruning | B60R 21/205 | 280/728.2 |
| 8,308,189 B2 * | 11/2012 | Matsushima | B60R 21/206 | 180/90 |
| 8,454,074 B2 * | 6/2013 | Ono | B60R 7/06 | 296/37.12 |
| 8,491,037 B2 * | 7/2013 | Sheng | B60R 21/045 | 296/187.05 |
| 8,596,712 B2 * | 12/2013 | Miller | B62D 21/15 | 296/187.03 |
| 8,746,732 B1 * | 6/2014 | Kutchey | B60R 21/206 | 280/728.2 |
| 8,801,087 B2 * | 8/2014 | Kim | B62D 25/145 | 296/193.02 |
| 8,950,802 B2 * | 2/2015 | Hasl | B62D 25/145 | 296/193.02 |
| 8,955,877 B2 | 2/2015 | Broussard et al. | | |
| 8,979,176 B2 * | 3/2015 | Atsumi | B62D 25/145 | 296/193.02 |
| 8,985,679 B2 * | 3/2015 | Da Costa Pito | B62D 25/145 | 296/193.02 |
| 9,156,425 B1 * | 10/2015 | Solomon | B60R 21/206 | |
| 9,333,988 B2 * | 5/2016 | Baudart | B62D 25/145 | |
| 2004/0124617 A1 * | 7/2004 | Morita | B60R 21/206 | 280/732 |
| 2005/0194767 A1 * | 9/2005 | Freisler | B60R 21/206 | 280/728.2 |
| 2007/0056748 A1 * | 3/2007 | Feith | B62D 25/142 | 166/387 |
| 2014/0103685 A1 * | 4/2014 | Mani | B62D 25/145 | 296/193.02 |
| 2015/0291120 A1 * | 10/2015 | Kim | B60R 21/215 | 280/728.2 |

* cited by examiner

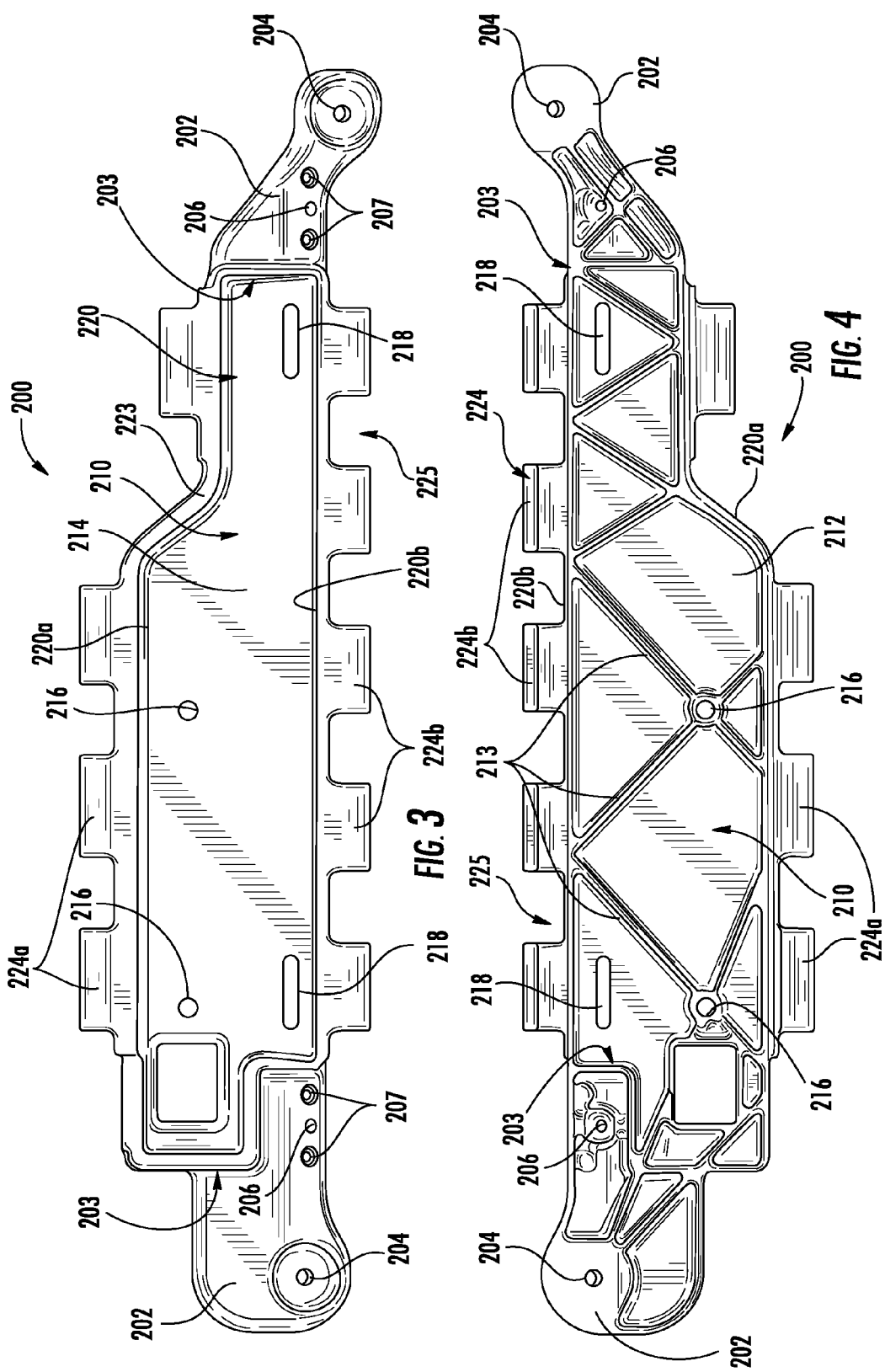

GLOVE BOX RAIL WITH INTEGRATED AIRBAG SUPPORT

BACKGROUND

The present invention relates generally to the field of glove box structures in vehicles.

A dashboard in a vehicle may include a glove box assembly supported by a rail. Knee airbags may be mounted beneath the rail to protect occupants in the vehicle in the event of a collision.

Conventionally, the rail is a non-structural part to which the glove box assembly is connected. For example, the rail may have a simple box-shaped cross section that spans between two sections of the dashboard. In order to position a knee airbag below the conventional non-structural rail, the airbag canister must be contained within a separate structural housing for distributing the loads generated by the airbag upon deployment, without passing them onto the dashboard. The housing is separately formed from and then joined to the rail.

Fuel efficiency and cost are important drivers in the automotive industry, which has demonstrated a strong focus over at least the past decade for improving each. Cost can be reduced, for example, by using less material to form the components of a vehicle. Further, less material results in a weight reduction, and therefore improved fuel efficiency. Weight may also be reduced by substituting lighter-weight alloys (e.g., alloys containing magnesium) or aluminum for parts traditionally formed from steel. This change can be seen, for example, as companies shift production of airbag housings from steel to composites and plastics. However, even more weight savings can be achieved by developing new structural components in vehicles that can support an airbag canister, eliminating the long-standing need for such housings.

SUMMARY

In one exemplary embodiment, a rail for supporting a glove box assembly and airbag canister includes a substantially planar body having an upper and lower surface, the upper surface defining a plurality of ribs. The rail further includes a wall projecting from at least a portion of an outer periphery of the lower surface, a first plurality of connection points configured to couple an airbag canister to the rail, and a second plurality of connection points configured to couple a glove box assembly to the rail. The rail further includes a first appendage extending from a first end of the body and a second appendage extending from a second end of the body, the first and second appendages configured to couple the rail to a dashboard assembly. The rail is integrally formed as a single component.

In another exemplary embodiment, a dashboard assembly for a vehicle includes a dashboard having a center section and an end forming opposing sides of a void, and a rail disposed between the center section and the end of the dashboard, the rail providing structural rigidity to the dashboard. The rail includes a first appendage configured to couple to the center section and a second appendage configured to couple to the end of the dashboard. The assembly further includes an airbag canister coupled to the rail.

BRIEF DESCRIPTION OF THE DRAWINGS

FIG. 3 is a bottom plan view of the glove box support rail of FIG. 2.

FIG. 4 is a top plan view of the glove box support rail of FIG. 2.

DETAILED DESCRIPTION

A glove box support rail is coupled to a dashboard for supporting a glove box assembly. As described in the present application, a glove box support rail may be configured to support an airbag canister without a separable housing.

According to an exemplary embodiment, the rail is formed as a single piece. For example, the rail may be formed by a stamping process. The rail may be formed from various materials (e.g., steel, various alloys, aluminum, plastic, composite, etc.). According to an exemplary embodiment, the rail is formed from a magnesium alloy.

Figure 1:
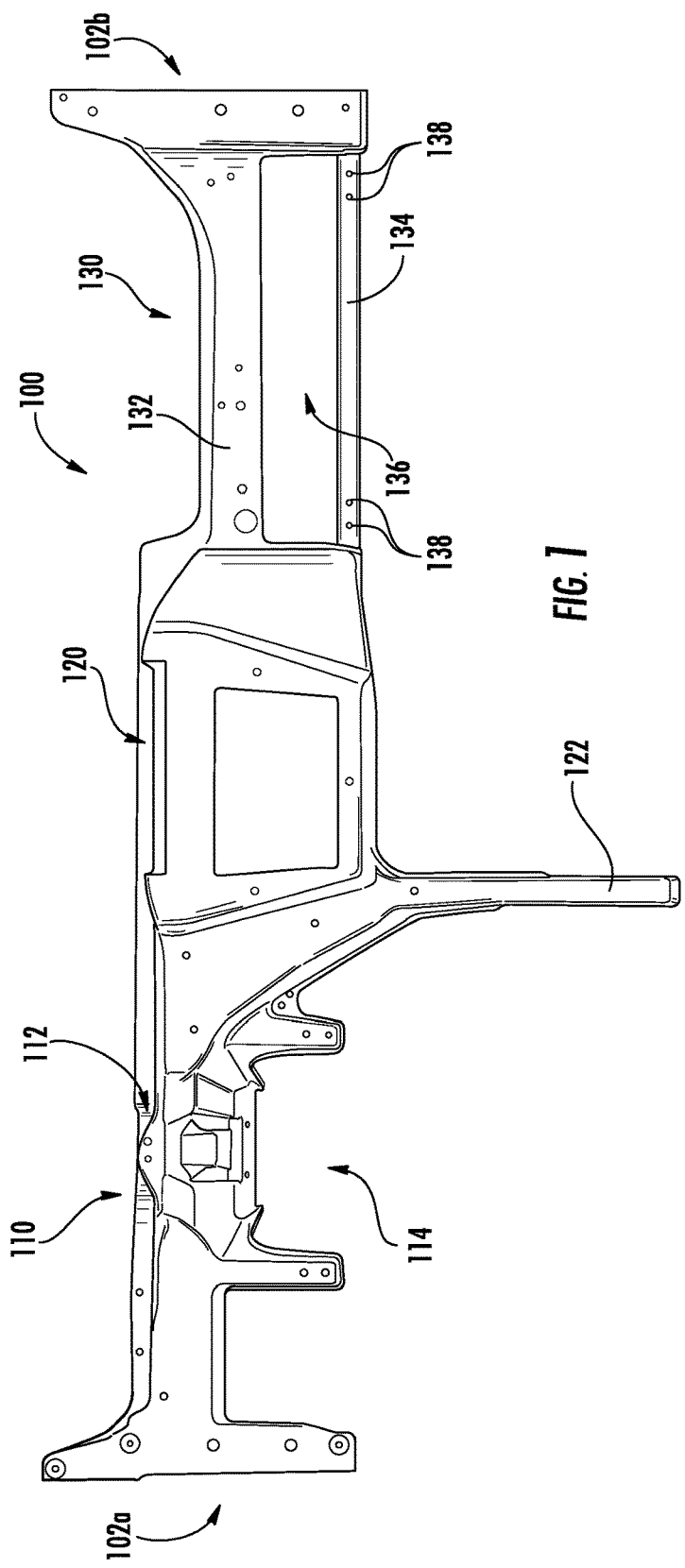
FIG. 1 is a rear elevation view of a dashboard from a position inside a vehicle cabin.

Referring to FIG. 1, an example of a conventional dashboard 100 is shown. The dashboard 100 extends laterally across a vehicle with ends 102a, 102b of the dashboard 100 joining opposing sides of the vehicle. The dashboard 100 includes a driver section 110, a center section 120, and a passenger section 130. The driver section 110 may support a gauge cluster (not shown) at an upper end 112 thereof and a steering column (not shown) at a lower end 114 thereof. The center section 120 includes at least one downwardly-extending support member 122 for joining the dashboard 100 to the vehicle. The center section 120 may be configured to receive various components (e.g., media system, heating, ventilation, and air condition ("HVAC") controls, center console, etc.). The passenger section 130 includes an upper rail 132 and a lower rail 134. The upper rail 132 may be integrally formed with the dashboard 100 and the lower rail 134 may be separately formed from the dashboard 100. The upper and lower rails 132, 134 extend between the center section 120 and the end 102b of the dashboard 100, forming opposing sides of a void 136 therebetween. The upper rail 132 may be configured to receive (e.g., couple to) a passenger airbag assembly (not shown). The passenger airbag assembly is configured to deploy an airbag to protect an occupant situated on a passenger side of the vehicle in the event of an accident. As shown in FIG. 1, the lower glove box rail 134 is a non-structural part having a generally box-shaped cross section. A glove box assembly (not shown) includes a bin and a door pivotably joined to the bin, wherein the door is configured to enclose the bin. The glove box assembly may be received in the void 136. The upper and lower rails 132, 134 include connection points 138 for joining the glove box assembly to the dashboard 100.

Figure 2:
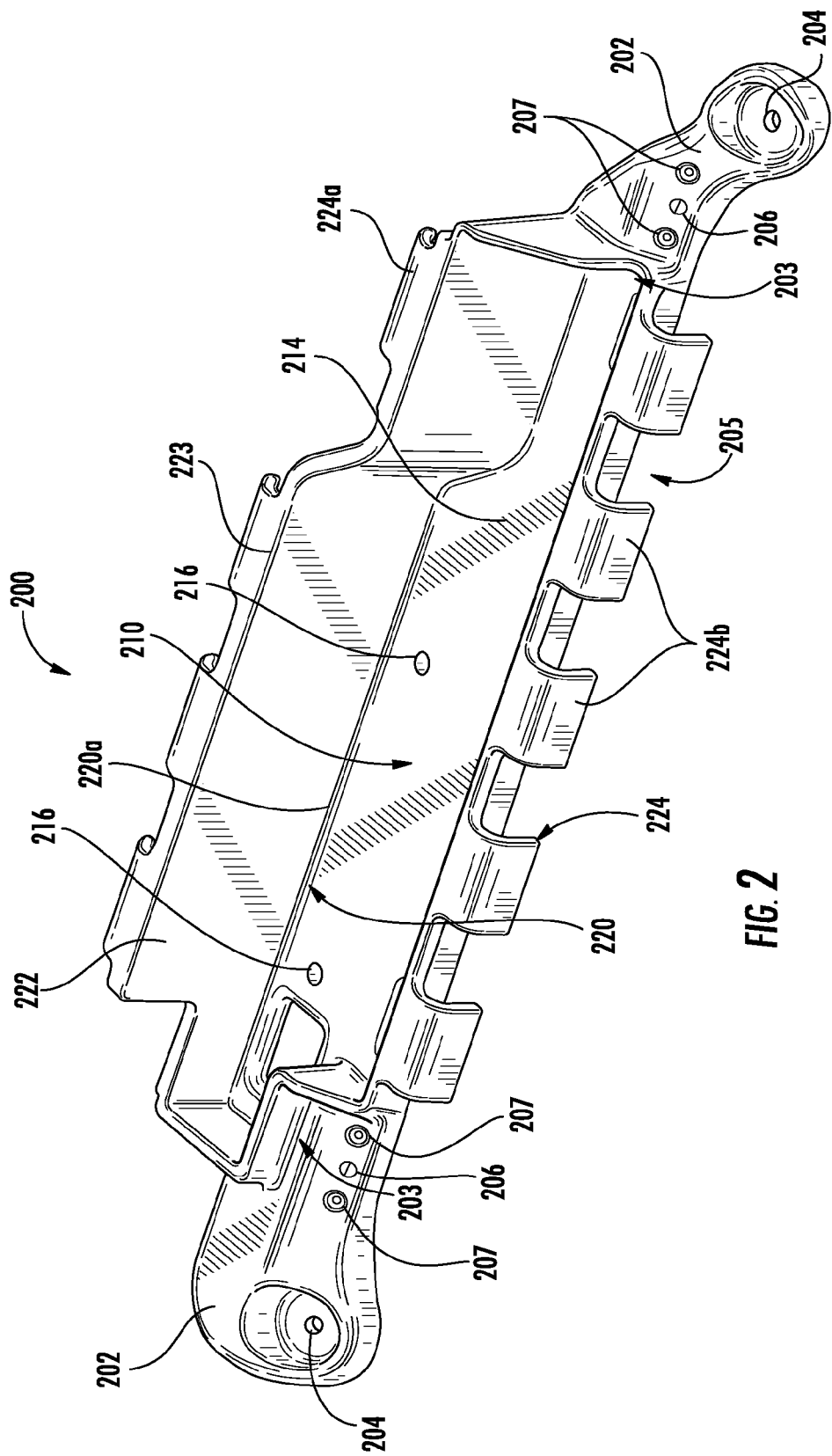
FIG. 2 is a bottom perspective view of a glove box support rail according to an exemplary embodiment.
Figure 7:
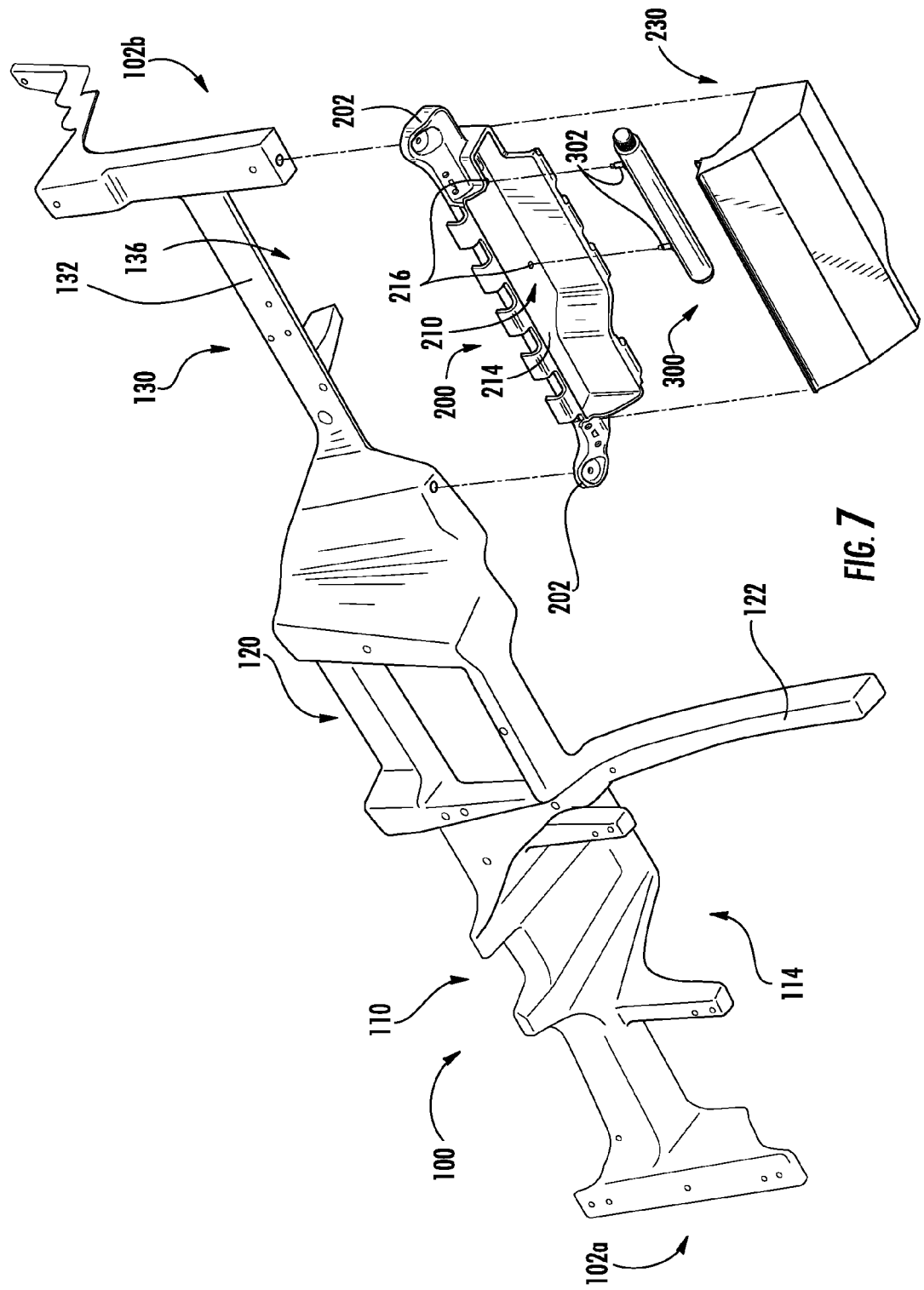
FIG. 7 is an exploded view of a dashboard assembly with a glove box support rail according to an exemplary embodiment.
Figure 8:
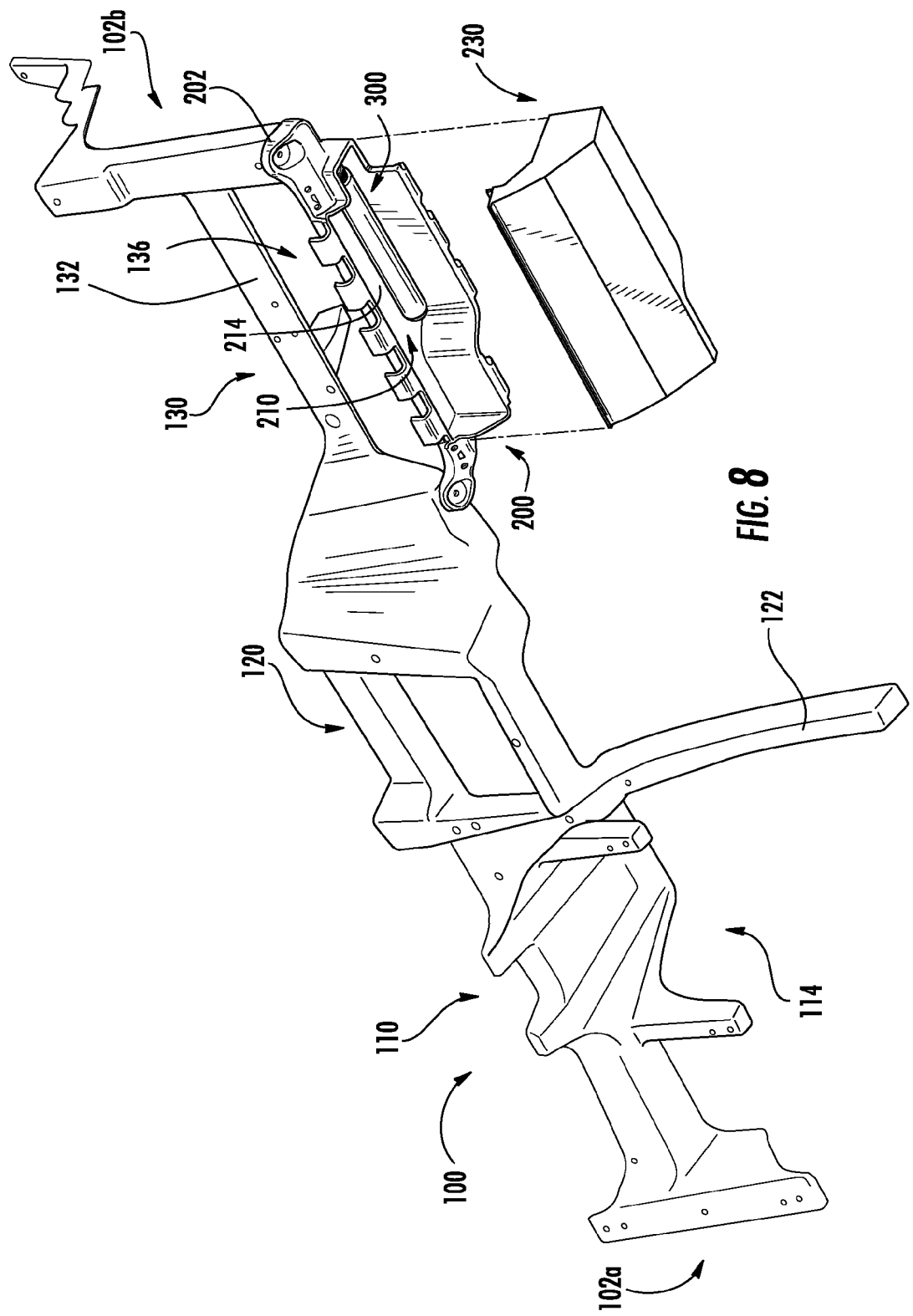
FIG. 8 is a partially-assembled view of the dashboard assembly of FIG. 7.

Referring generally to FIGS. 2-4, a rail 200 is shown according to an exemplary embodiment. The rail 200 includes a substantially planar body 210 and appendages 202 extending outwardly from the body 210. The appendages 202 may extend from opposing ends 203 of the body 210. According to an exemplary embodiment, the appendages 202 extend in opposite directions. FIGS. 2-4 show a rail 200 with two appendages 202, although more or fewer appendages 202 may be used. As shown in FIGS. 7 and 8, the appendages 202 are configured to join the rail 200 to the dashboard 100. For example, each appendage 202 may include at least one dashboard connection point 204. Each of the appendages 202 may be joined at a respective connection point 204 to either of the center section 120 of the dashboard 100 or the end 102b of the dashboard 100. According to an exemplary embodiment, the rail 200 may be directly coupled to the dashboard 100. According to other exemplary embodiments, the appendages 202 may connect to the dashboard 100 in other ways. As shown in FIG. 2, the dashboard connection points 204 are openings extending through the appendage 202. Bolts may be fed through the dashboard connection points 204 into corresponding openings in the dashboard 100 for fastening the rail 200 to the dashboard. According to other exemplary embodiments, the dashboard connection points 204 may utilize other means (e.g., rivets, threaded projections, etc.) for joining the rail 200 to the dashboard 100.

The appendages 202 also include glove box mounting points 206. The glove box mounting points 206 are configured to receive and/or engage the glove box assembly. The glove box assembly may be installed in the vehicle by joining the glove box assembly to the rail 200 at the glove box mounting points 206. The glove box assembly may be joined to the rail 200 either before or after the rail 200 is joined to the dashboard 100. As shown in FIG. 2, each appendage has one mounting point 206, although each appendage 202 may have more or fewer mounting points 206. As with the dashboard connection points 204, FIG. 2 shows the mounting points 206 as openings extending through the appendage 202. Bolts may be fed through the mounting points 206 into corresponding openings in a glove box assembly for fastening the glove box assembly to the rail 200. According to another exemplary embodiment, the glove box assembly may include integrated bolts to be fed through the mounting points 206. According to other exemplary embodiments, the mounting points 206 may utilize other means (e.g., rivets, threaded projections, etc.) for joining the glove box assembly to the rail 200. The rail 200 may include at least one locating feature 207 configured to guide (i.e., locate, position, etc.) the glove box assembly into engagement with the rail 200. For example, the at least one locating feature 207 may include a bore in an appendage 202 configured to receive a corresponding feature (e.g., projection) on the glove box assembly. According to other exemplary embodiments, the at least one locating feature 207 may guide the glove box assembly in other ways. As shown in FIGS. 2 and 3, each appendage 202 includes two locating features 207. According to other exemplary embodiments, each appendage 202 may have more or fewer locating features 207.

The body 210 includes an upper surface 212 and a lower surface 214. A plurality of ribs 213 extend upward from the upper surface 212 and are configured to provide structural rigidity to the rail 200. Further, the presence of the ribs 213 and/or the rail 200 itself may provide additional structural rigidity to the dashboard 100. The increased structural rigidity of the rail 200 may provide additional protection to occupants in a vehicle and additional flexibility for arranging components within the vehicle. For example, a HVAC system 140 (not shown) may be disposed within the vehicle on the other side of the dashboard 100 as the occupant. According to an exemplary embodiment, the rail 200 includes a plurality of ribs 213 configured to absorb the loads necessary for retaining the HVAC system 140 during a collision. The added structure of the plurality of ribs 213 on the rail 200 allows for manufacturers to increase the variety and sizes of components that can be installed behind the dashboard 100 compared to a vehicle without a rail 200 with a plurality of ribs 213. The HVAC system 140 may be coupled to the rail 100 in order to contain it in front of the dashboard 100. According to another exemplary embodiment, the rail 100 is disposed between the HVAC system 140 and the occupant such that the HVAC system 140 would come in contact with the rail 200 rather than entering the vehicle cabin 150. According to other exemplary embodiments, the rail 200 may be configured to retain other vehicle components (e.g., media devices, passive or active safety systems, etc.) in similar ways. According to other exemplary embodiments, the rail 200 may include other structural members (e.g., cross members, flanges, etc.) to provide structural rigidity to the rail 200.

The lower surface 214 defines an outer periphery 220 having a front edge 220a and a rear edge 220b. Each of the front edge 220a and the rear edge 220b may span between the ends 203 of the body 210. A wall 222 projects from at least a portion of the outer periphery 220. According to an exemplary embodiment, the wall 222 projects substantially perpendicular to the lower surface 214. The wall 222 may be configured to influence the direction an airbag deploys. The wall 222 and/or the rail 200 may be configured to distribute loads to the dashboard 100 during airbag deployment. According to other exemplary embodiments, the wall 222 may project from different locations on the lower surface 214 or from the upper surface 212 and may project in different directions and form different shapes. For example, the wall 222 may extend around the entire outer periphery 220. According to another exemplary embodiment, the wall 222 may include two or more separate sections.

The rail 200 may include opposing flanges 224. According to an exemplary embodiment, the flanges 224 may include at least a first plurality of flanges 224a and a second plurality of flanges 224b, with each flange 224 separated by a void 225. As shown in FIG. 2, the first plurality of flanges 224a projects from an upper end 223 of the wall 222, away from the rear edge 220b of the lower surface 214. The second plurality of flanges 224b projects from the rear edge 220b of the lower surface 214, away from the front edge 220a. According to other exemplary embodiments, the flanges 224 may project from the wall 222 or the lower surface 214 in other positions and directions. For example, flanges 224 may project from separate first and second sections of the wall 222.

Figure 5:
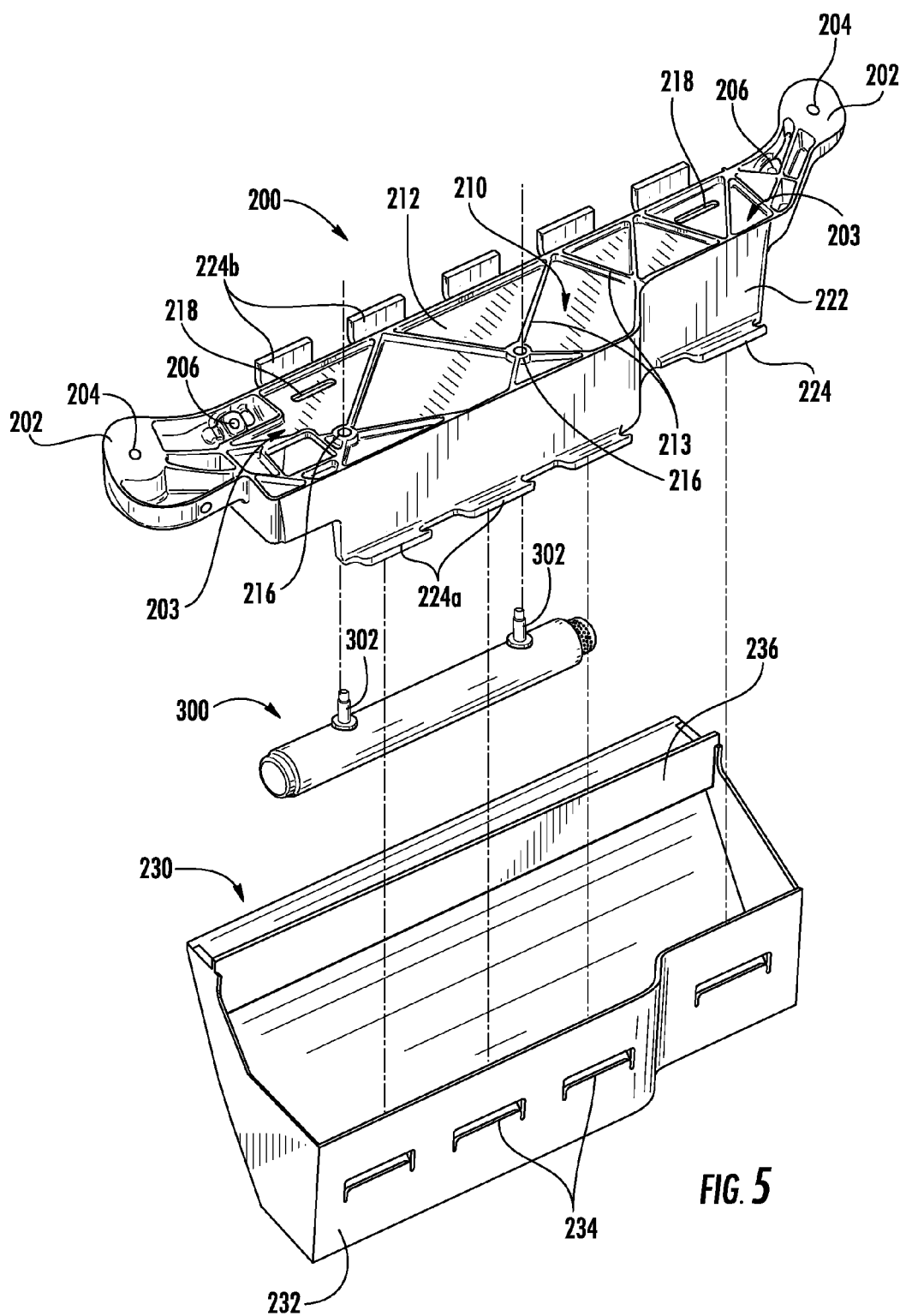
FIG. 5 is an exploded view of a partial glove box support rail assembly according to an exemplary embodiment.
Figure 6:
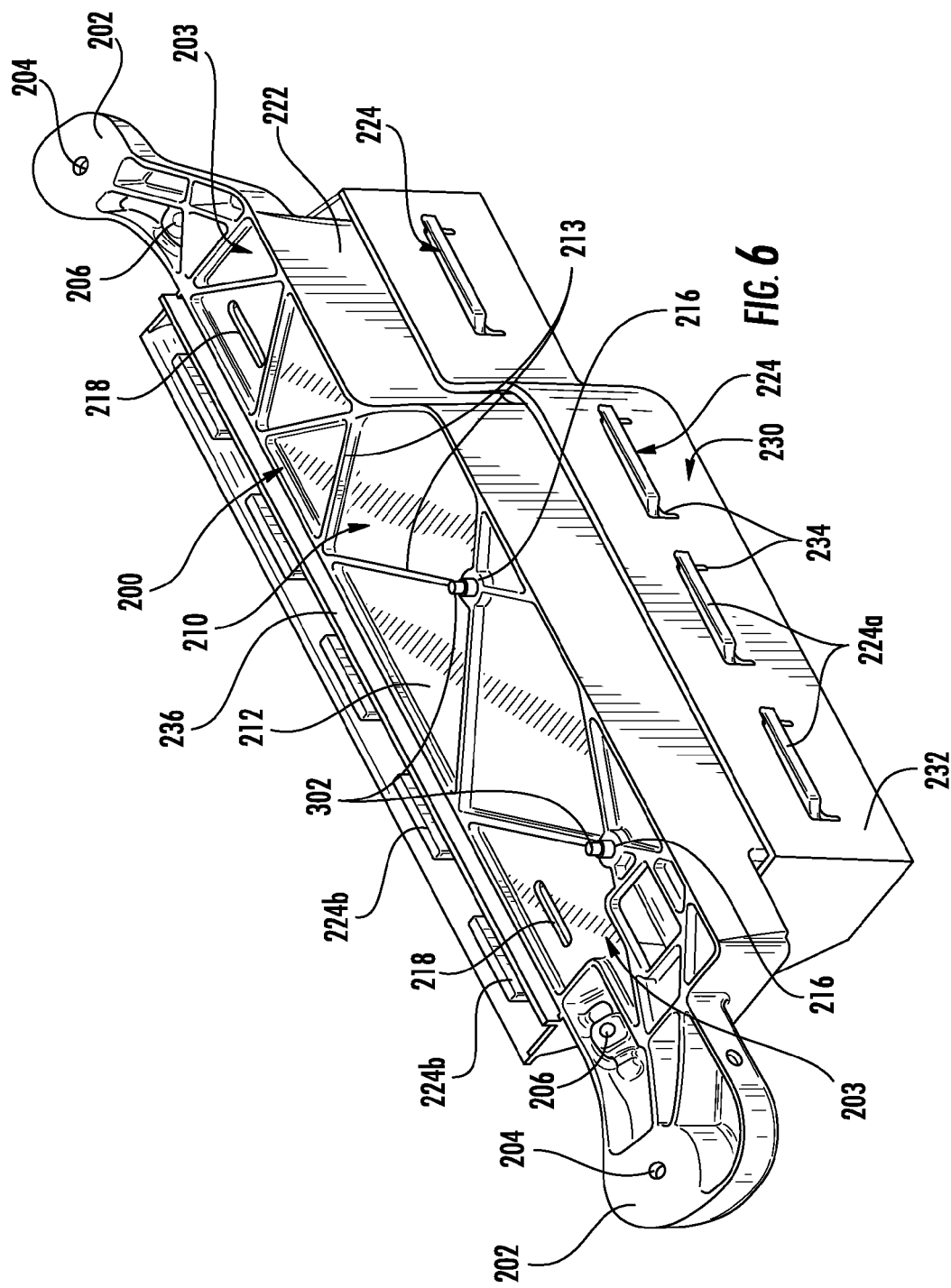
FIG. 6 is an assembled view of the partial glove box support rail assembly of FIG. 5.

Referring to FIGS. 5 and 6, the flanges 224 are configured to receive a cover 230. The cover 230 extends between the first plurality of flanges 224a and the second plurality of flanges 224b to conceal at least a portion of the lower surface 214. For example, the cover 230 may include opposing walls 232 defining openings 234 in at least one of the walls 232, the openings 234 configured to receive the flanges 224 and secure the cover 230 to the rail 200. As shown in FIG. 5, the cover 230 may include at least one lip 236, which extends substantially parallel to at least one of the walls 232. The flanges 224 may engage the lip 236 to secure the cover 230 to the rail 200. According to an exemplary embodiment, the first plurality of flanges 224a engages the openings 234 in the cover 230 and the second plurality of flanges 224b engages the lip 236. During installation of the cover 230, the walls 232 may be temporarily deformed to fit around outer edges of the flanges 224. The flanges 224 are then received in corresponding openings 234 in the walls 232 or under the lip 236. For example, the space between the walls 232 may deform (i.e., stretch) to be wider than the distance between the opposing flanges 224, then retract to a smaller distance such that the flanges 224 engage the openings 234 or the lip 236 with an interference fit, preventing the cover 230 from being withdrawn. According to other exemplary embodiments, the cover 230 may connect to the rail 200 in other ways (e.g., bolt, threaded projection, adhesive, etc.). The cover 230 is configured to split (e.g., break, rupture, etc.) when an airbag is deployed, such that the airbag passes through and/or around the cover. The cover 230 may be a decorative (e.g., upholstered) panel for visually blending in with an interior of the vehicle.

Referring to FIGS. 7 and 8, the body 210 is configured to receive an airbag canister 300 without a separable housing disposed therebetween. According to an exemplary embodiment, the airbag canister 300 is directly coupled to the rail. For example, the airbag canister 300 may engage the lower surface 214 of the body. The body 210 includes airbag connection points 216 configured to couple the airbag canister 300 to the rail 200. As shown in FIG. 5, the airbag connection points 216 include two openings extending from the lower surface 214, through the body 210, to the upper surface 212, although more or fewer openings may be used. The airbag connection points 216 may extend through the plurality of ribs 213. According to an exemplary embodiment, the airbag connection points 216 extend through the plurality of ribs 213 where two or more ribs 213 intersect. The airbag canister 300 may include posts (e.g., bolts) 302 configured to be received in corresponding airbag connection points 216 to secure the airbag canister 300 to the rail 200. For example, as shown in FIG. 6, the posts 302 may be fed through the airbag connection points 216 from the lower surface 214 until the posts 302 extend past the upper surface 212. The posts 302 may then be secured by a nut tightened against the upper surface 212. According to other exemplary embodiments, the airbag connection points 216 may utilize other means for joining the airbag canister 300 to the rail 200 (e.g., rivets, bolts, threaded projections, etc.).

The airbag canister 300 may house an airbag 310 (not shown) and an inflator 312 (not shown). During a collision, the inflator 312 is activated and inflates the airbag 310. Loads generated when the inflator 312 is activated may be distributed from the airbag canister 300 to the rail 200. For example, the loads may be applied by the posts 302 to the airbag connection points 216. The loads may then be distributed to the body 210 and the plurality of ribs 213.

As shown in FIG. 5, the airbag canister 300 is generally cylindrical. According to other exemplary embodiments, the airbag canister 300 may be other shapes. The airbag 310 may be configured to deploy from a position in the dashboard 100 proximate to an occupant's knees. For example, the airbag 310 may be a knee airbag, configured to provide a cushion in the event of a collision to restrain an occupant's lower body. Straps 314 (not shown) may extend from the airbag 310 to retain at least a portion of the airbag 310 by the rail 200.

Referring to FIGS. 3 and 4, the body 210 may include slots 218 configured to couple at least a portion of the airbag 310 to the rail 200. Each slot 218 defines an elongated opening through the body 210, although the slots 218 may have other shapes. As shown in FIG. 3, the body 210 includes two slots 218 extending from the lower surface 214, through the body 210, to the upper surface 212, although more or fewer slots 218 may be used. The straps 314 extend from the airbag 310 and are fed through the slots 218 to control the direction that the airbag 310 deploys. An end of each strap 314 includes a T-shape. The end of the strap 314 may be compressed (i.e., deformed) such that it is generally flat and fits through a corresponding slot 218. The end is then fed through the slot 218 and, once released, regains its T-shape. The top of the T-shape sits perpendicularly to the corresponding slot 218, preventing the end of the strap 314 from being withdrawn therefrom.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A rail for supporting a glove box assembly and airbag canister, the rail comprising:

a substantially planar body having an upper and lower surface, the upper surface defining a plurality of ribs;

a first rib and a second rib of the plurality of ribs to intersect at an intersection point;

a wall projecting from at least a portion of an outer periphery of the lower surface;

a first plurality of connection points disposed in the body, a first connection point of the first plurality of connection points to extend through the first rib and the second rib at the intersection point;

an airbag canister coupled to the rail at the first plurality of connection points without a housing disposed between the body and the airbag canister;

a second plurality of connection points configured to couple a glove box assembly to the rail; and a first appendage extending from a first end of the body and a second appendage extending from a second end of the body, the first and second appendages configured to couple the rail to a dashboard assembly;

wherein the rail is integrally formed as a single component.

2. The rail of claim 1, wherein the plurality of ribs are configured to provide structural rigidity to the rail.

3. The rail of claim 1, wherein at least one of the first and second appendages is configured to couple directly to a dashboard.

4. The rail of claim 3, wherein the second plurality of connection points is disposed in at least one of the first and second appendages.

5. The rail of claim 4, wherein the glove box assembly is coupled to the second plurality of connection points.

6. The rail of claim 1, wherein the rail is configured to provide structural rigidity to a dashboard.

7. The rail of claim 1, wherein the rail is configured to directly couple to a vehicle dashboard.

8. The rail of claim 1, wherein the airbag canister is coupled to the rail without a separable housing disposed therebetween.

9. The rail of claim 1, wherein the airbag canister is directly coupled to the rail.

10. The rail of claim 1, further comprising a first plurality of flanges extending from the body and a second plurality of flanges extending from a bottom end of the wall, each plurality of flanges configured to engage a cover.

11. The rail of claim 10, wherein the cover is received by the first and second plurality of flanges with an interference fit.

12. The rail of claim 11, wherein the cover is configured to split, at least in part, upon deployment of an airbag.

13. The rail of claim 1, wherein the rail is formed from a magnesium alloy.

14. A dashboard assembly for a vehicle, the dashboard assembly comprising:

a dashboard having a center section and an end forming opposing sides of a void; and a rail disposed between the center section and the end of the dashboard, the rail providing structural rigidity to the dashboard;

wherein the rail comprises:

a substantially planar body having an upper surface defining a plurality of ribs;

a first rib and a second rib of the plurality of ribs to intersect at an intersection point;

a first plurality of connection points disposed in the body, a first connection point of the plurality of connection points to extend through the first rib and the second rib at the intersection point;

a first appendage configured to couple to the center section; and a second appendage configured to couple to the end of the dashboard; and wherein an airbag canister is coupled to the body at the first plurality of connection points without a separable housing disposed between the body and the airbag canister.

15. The dashboard assembly of claim 14, wherein the airbag canister includes a knee airbag configured to restrain the knees of a passenger in a vehicle when deployed.

16. The dashboard assembly of claim 14, wherein the first appendage is directly coupled to the center section and the second appendage is directly coupled to the end of the dashboard.

17. The dashboard assembly of claim 14, wherein the rail is formed from a magnesium alloy.

* * * * *